(12) United States Patent
Liu et al.

(10) Patent No.: US 11,467,920 B2
(45) Date of Patent: Oct. 11, 2022

(54) METHODS AND SYSTEMS TO INDEX FILE DATA OF VIRTUAL MACHINE (VM) IMAGE

(71) Applicant: EMC IP Holding Company LLC, Hopkinton, MA (US)

(72) Inventors: Cherami Liu, Shanghai (CN); Yubing Zhang, Shanghai (CN); Scott Zhang, Shanghai (CN); Lihui Su, Shanghai (CN); Jerry Jourdain, Hudson, NH (US); Adam Brenner, Mission Viejo, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 686 days.

(21) Appl. No.: 16/171,216

(22) Filed: Oct. 25, 2018

(65) Prior Publication Data

US 2020/0133791 A1 Apr. 30, 2020

(51) Int. Cl.
*G06F 16/00* (2019.01)
*G06F 11/14* (2006.01)
*G06F 9/455* (2018.01)
*G06F 16/13* (2019.01)

(52) U.S. Cl.
CPC ...... *G06F 11/1464* (2013.01); *G06F 9/45558* (2013.01); *G06F 16/13* (2019.01); *G06F 2009/45583* (2013.01); *G06F 2009/45595* (2013.01); *G06F 2201/815* (2013.01)

(58) Field of Classification Search
CPC .. G06F 11/1464; G06F 16/13; G06F 9/45558; G06F 2009/45583; G06F 2009/45595; G06F 2201/815
USPC ........................................................ 707/650
See application file for complete search history.

(56) References Cited

U.S. PATENT DOCUMENTS

| | | | |
|---|---|---|---|
| 8,352,431 B1 * | 1/2013 | Protopopov | G06F 16/128 707/640 |
| 9,552,242 B1 * | 1/2017 | Leshinsky | G06F 11/0709 |
| 9,594,803 B2 * | 3/2017 | Welton | G06F 16/10 |
| 9,628,561 B1 * | 4/2017 | Kulkarni | G06F 11/1464 |
| 9,684,659 B1 * | 6/2017 | Protopopov | G06F 16/122 |
| 10,289,549 B1 * | 5/2019 | Shilane | G06F 3/0685 |
| 10,303,555 B1 * | 5/2019 | Lee | G06F 11/1446 |
| 2009/0254572 A1 * | 10/2009 | Redlich | G06Q 10/06 |
| 2012/0078847 A1 * | 3/2012 | Bryant | G06F 3/0635 707/647 |
| 2014/0089264 A1 * | 3/2014 | Talagala | G06F 3/0616 707/649 |
| 2019/0050296 A1 * | 2/2019 | Luo | G06F 11/1458 |

* cited by examiner

*Primary Examiner* — Monica M Pyo
(74) *Attorney, Agent, or Firm* — Womble Bond Dickinson (US) LLP

(57) ABSTRACT

According to one embodiment, one or more consistent states of a virtual machine (VM) are backed up and stored. An index library is used to extract, from the consistent state(s) of the VM, metadata corresponding to content files captured in the consistent state(s). The extracted metadata is stored into a metadata catalog, where the metadata catalog is subsequently downloaded by an index server to index the content files captured in the consistent state(s).

18 Claims, 7 Drawing Sheets

500

501 → VMDK | 502 → File metadata

|  | VMDK | File metadata |
|---|---|---|
| Size | 60GB | 600MB |
| Download time | 16.7 min | 10 s |
| Disk size required | 60GB | 600MB |

511 → VMDK | 512 → File metadata

|  | VMDK | File metadata |
|---|---|---|
| Average Size | 60GB | 600MB |
| Download time | 83.5 min | 50 s |
| Disk size required | 300GB | 3GB |

FIG. 5B

METHODS AND SYSTEMS TO INDEX FILE DATA OF VIRTUAL MACHINE (VM) IMAGE

FIELD OF THE INVENTION

Embodiments of the present disclosure relate generally to file data indexing. More particularly, embodiments of the disclosure relate to methods and systems to index file data of virtual machine (VM) image.

BACKGROUND

Nowadays, people are eager to search or analyze backup data in a software-defined information technology (IT) infrastructure (e.g., hyper-converged infrastructure) as well as cloud environment. Therefore, indexing of file metadata has become one of the top requirements for data protection software. In order to index the backup data, the first obstacle for a search system of data protection is to obtain the file metadata from the backup system. For file system backups, it is relatively easy to obtain metadata of files because the backup system collects the file metadata catalog. However, for virtual machine (VM) backups, one of the challenges is to obtain the file metadata from a VM backup with efficiency when running with limited central processing unit (CPU)/input output (IO) throughput in virtualization from the IT infrastructure and cloud environment. The reason is because virtualization clients (e.g., VMWare clients) are backed up as virtual disks, and the backup server does not abstract the file metadata during the backup operation. Accordingly, only virtual disk level metadata is recorded by the backup server. A search system, however, needs to obtain file level metadata (or file metadata) to perform.

Referring now to FIG. 1, which is a block diagram illustrating a conventional virtualization management system, one solution to obtain file level metadata is by having an index server download the VM backups from a storage system, and subsequently parse the VM backups to obtain the metadata. For example, system 100 includes one or more client systems 101-102 communicatively coupled to VM management server 150 (also referred to as virtual center or vCenter) and storage system 180 over network 103. VM management server 150 manages VM configuration information of client 101 and/or client 102. VM management server 150 sends a backup request for a VM hosted by a virtual machine monitor (VMM) on client 101/102. The VMM thereafter establishes a consistent state, or a snapshot, for the VM. The snapshot is included in VM disk data (e.g., VMDK files) and/or included in snapshot differencing data (e.g., AVHDX files), which are stored on storage system 180 (e.g., a backup server). The VM disk data can be downloaded from storage system 180 over network 103 and onto index server 151, where index server 151 can parse and extract the file level metadata from the VM disk data (e.g., consistent states). However, there are several problems to this solution. First, the network bandwidth cost is high since it brings heavy network traffic between storage system 180 and index server 151 to transport the VM disk data. Second, the solution requires index server 151 to have large disk space to store and parse the VM disk data. Third, additional CPU resource is required by index server 151 in order to parse the VM disk data.

Another solution is deploying an agent on each of clients 101-102. For example, referring now to FIG. 2, each of clients 101-102 includes an agent (not shown) installed thereon that collects file level metadata (e.g., file system changes). The file level metadata can be sent to and queued in message queue 160. Index server 151 can dequeue and obtain the file level metadata from message queue 160 over network 103 in order to process the file level metadata. However, there are also several problems to this solution. First, an agent is required to be installed on each VM client (e.g., clients 101-102), which brings additional efforts for customer deployment and adversely affects user experience. Second, it requires additional efforts for index server 151 to sync the file system state to one backup. This is a complex situation as index server 151 needs to capture the state of the VM client for the backup time from the continuous file system changes. Third, if the installed agent encounters a stop or crash, remediation is required to be performed for the VM client's file system state in order to guarantee the completeness of the data.

BRIEF DESCRIPTION OF THE DRAWINGS

Embodiments of the disclosure are illustrated by way of example and not limitation in the figures of the accompanying drawings in which like references indicate similar elements.

FIG. 5A is a table illustrating performance comparison of a conventional virtualization management system and the virtualization management system according to one embodiment using a single thread.

FIG. 5B is a table illustrating performance comparison of a conventional virtualization management system and the virtualization management system according to one embodiment using five threads.

DETAILED DESCRIPTION

Various embodiments and aspects of the disclosure will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, one or more consistent states of a virtual machine (VM) are backed up and stored. An index library is used to extract, from the consistent state(s) of the VM, metadata corresponding to content files captured in the consistent state(s). The extracted metadata is stored into a metadata catalog, where the metadata catalog is subsequently downloaded by an index server to index the content files captured in the consistent state(s).

In one embodiment, to use an index library to extract the metadata corresponding to content files captured in the consistent state(s), for each index in the index library, the consistent state(s) are parsed based on the index to obtain the metadata. In one embodiment, the index server is notified that a new VM has been backed up, where the new VM has been backed up if the metadata catalog is successfully created. In one embodiment, the metadata catalog is successfully created if metadata corresponding to each index in the index library is extracted and stored in the metadata catalog. In one embodiment, the index server downloads the metadata catalog when the index server receives the notification. In one embodiment, the consistent state(s) of the VM are backed up when a backup request for the VM is received from a VM management server.

In this way, IO traffic is reduced since the entire VM disk data from a storage system (e.g., backup server) is not required to be transported to an index server. This would save the cost of network stream when the storage system and the index server are deployed in different cloud regions or platforms. Moreover, this allows the indexing to take place in the storage system which balances the IO and CPU resources between the storage system and indexing server. Furthermore, the efficiency of indexing files from a VM image is increased, which results in better customer experience since recent backed up files from the VM image can be searched at an early stage.

Figure 1:
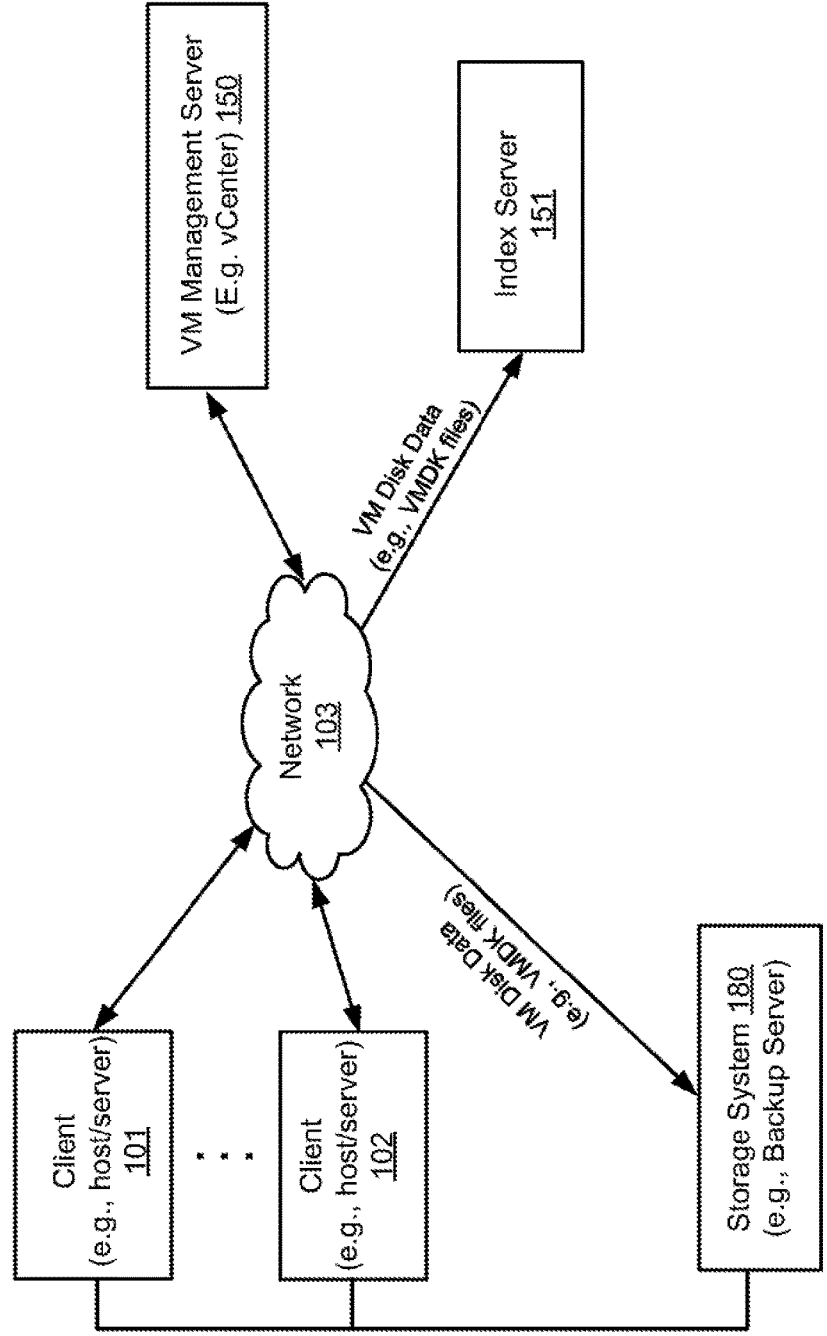
FIG. 1 is a block diagram illustrating a conventional virtualization management system.
Figure 2:
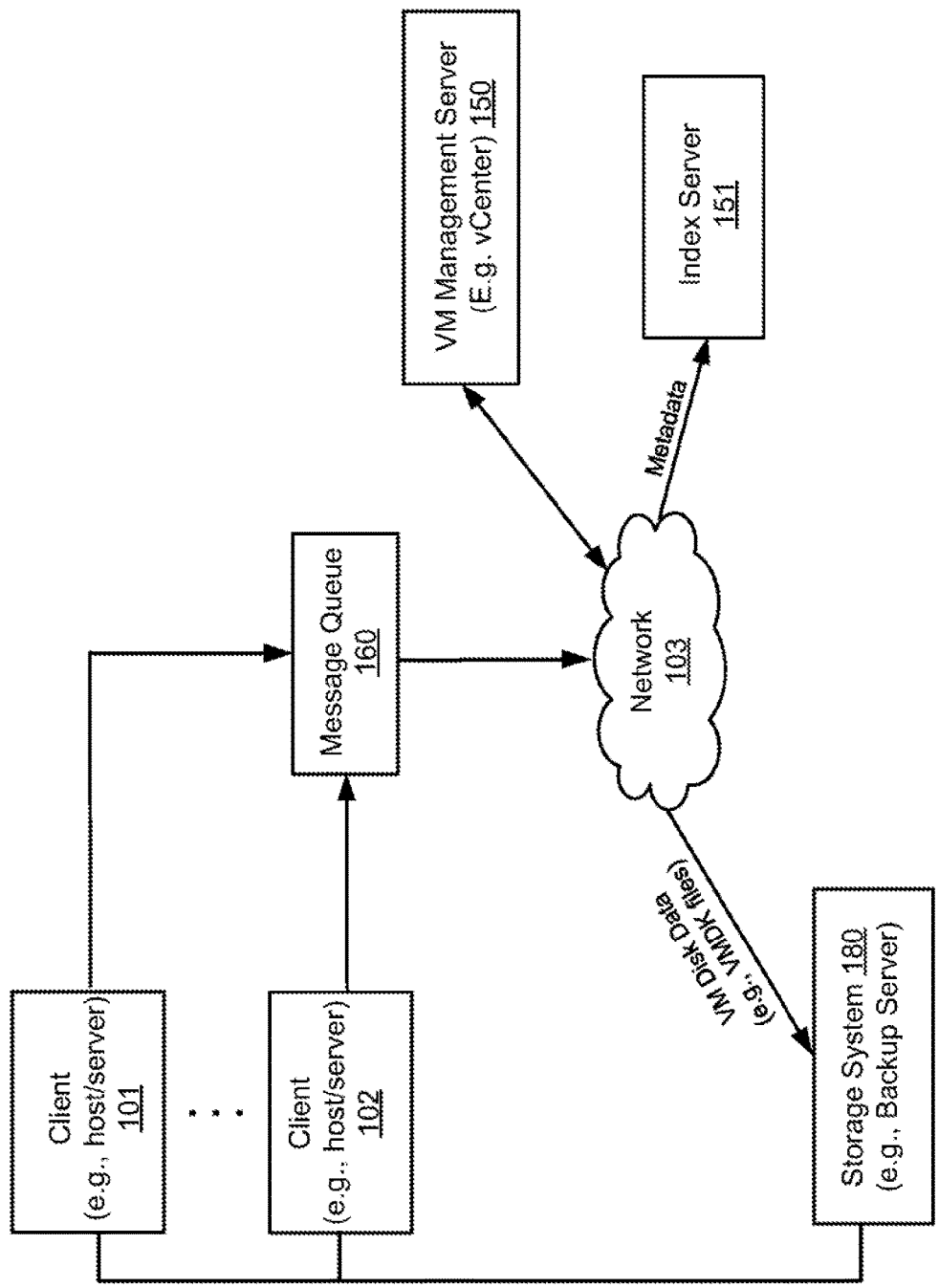
FIG. 2 is a block diagram illustrating another conventional virtualization management system.
Figure 3:
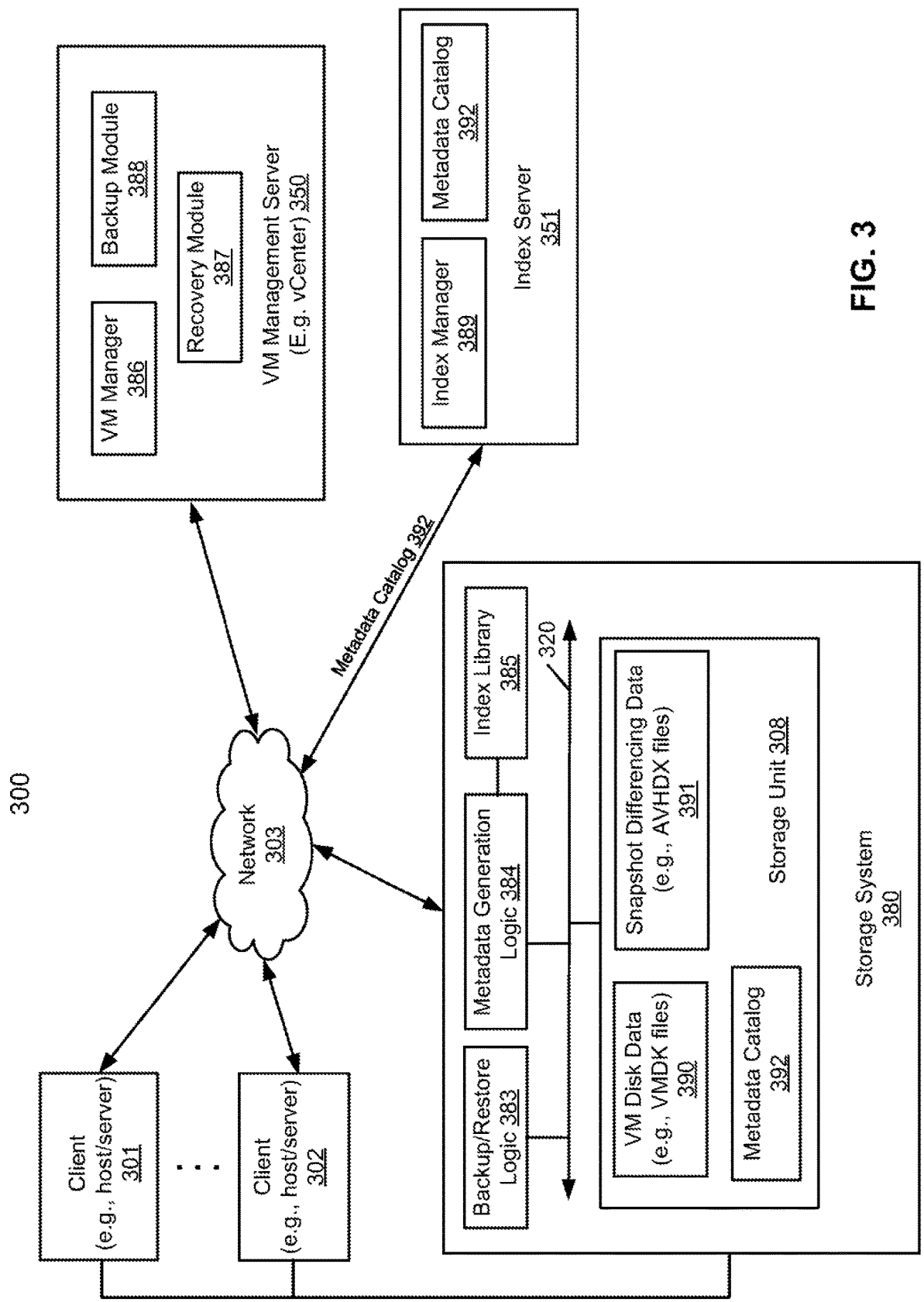
FIG. 3 is a block diagram illustrating a virtualization management system according to one embodiment.

FIG. 3 is a block diagram illustrating a virtualization management system according to one embodiment. Referring to FIG. 3, system 300 includes, but is not limited to, one or more client systems 301-302 communicatively coupled to VM management server 350 (also referred to as virtual center or vCenter) and storage system 380 over network 103. Clients 301-302 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 301-302 may be a primary storage system (e.g., local data center) that provides storage to other local clients, which may periodically back up the content stored therein to a backup storage system (e.g., a disaster recovery site or system). Network 303 may be any type of networks such as a local area network (LAN), a wide area network (WAN) such as the Internet, a fiber network, a storage network, or a combination thereof, wired or wireless.

In one embodiment, VM management server 350 includes, but is not limited to, VM manager 386, recovery module 387 (also referred to as recovery logic or recovery engine), and backup module 388 (also referred to as backup logic or backup engine). VM management server 350 manages VM configuration information of client 301 and/or client 302. For example, VM manager 386 may manage VM configuration information of multiple clients (e.g., clients 301-302), and each client contains one or more VMs managed by a virtual machine monitor (VMM) running therein. Although not shown in FIG. 3, VM Management server 350 may additionally be communicatively coupled with a backup application server and backup storage systems. In this example, VM management server 350 is communicatively coupled with clients 301-302 and storage system 380. In one embodiment, VM management server 350 may obtain VM information through various ways. For example, VM manager 386 may remotely synchronize with VMMs within network 303, or VMMs may update VM manager 386 whenever status change happens with VMs.

Figure 4:
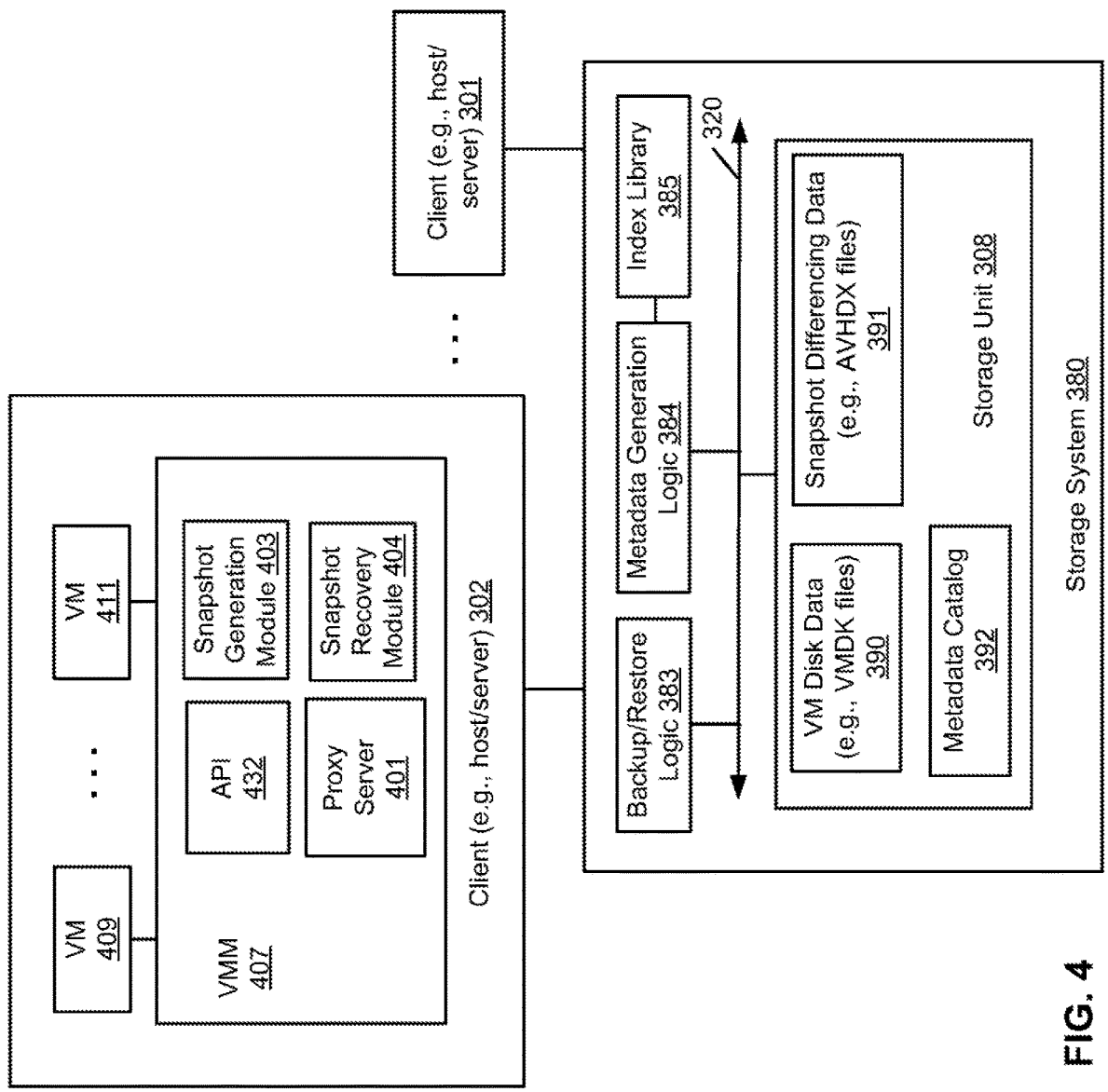
FIG. 4 is a block diagram illustrating clients and a storage system according to one embodiment.

Referring now to FIG. 4, which illustrates clients and a storage system according to one embodiment, VMM 407 includes, but is not limited to, application programming interface (API) 432, proxy server 401, snapshot generation module 403, and snapshot recovery module 404. API 432 allows any external system to communicate with VMM 407. Proxy server 401 allows VMM 407 to mount any VMs hosted on the client and to access files of the VMs. Snapshot generation module 403 can establish consistent states of VMs on the client. For example, VM management server 350 may send a backup request for VM 409 to VMM 407 via API 432. Snapshot generation module 403 of VMM 407 thereafter establishes a consistent state, or a snapshot, for VM 409. The snapshot may be included in VM disk data 390 (e.g., virtual machine disk (VMDK) or virtual hard disk (VHD) files) and/or included in snapshot differencing data 391 (e.g., AVHDX files). Snapshot recovery module 404 reverts or restores a VM (e.g., VMs 409-411) to a previously backed up or captured consistent state for that VM. For example, VM management server 350 may send a recovery request for VM 409 to VMM 407 via API 432. Snapshot recovery module 404 thereafter uses a previously backed up consistent state of the VM included in VM disk data 390 and/or snapshot differencing data 391 to recover the VM. That is, snapshot recovery module 404 reverts the VM to a previous state in accordance with the previously backed up consistent state. Proxy server 401 mounts the snapshot to allow file access to the snapshot.

Still referring to FIG. 4 in conjunction with FIG. 3, a user operating VM management server 350 can initiate a request to backup with a VM identifier (indicating VM 409 for example). Backup module 388 may identify that client 302 manages VMM 407, which hosts VM 409. Backup module 388 therefore may request VMM 407 via API 432 to establish a consistent state (also referred to as snapshot or checkpoint) of VM 409. Client 302 is communicatively coupled with storage system 380. The snapshot may be stored as part of VM disk data 390 and/or part of snapshot differencing data 391 on storage unit 308 of storage system 380.

Storage unit 308 may be implemented locally (e.g., single node operating environment) or remotely (e.g., multi-node operating environment) via interconnect 320, which may be a bus and/or a network (e.g., a storage network or a network similar to network 303). Storage unit 308 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Storage unit 108 may be located locally or remotely accessible over a network.

As shown in FIG. 4, for example, VM 409 resides on client 302. Client 302 includes one or more VMs 409-411 hosted by VMM 407. VMM 407 also includes the API 432, through which VMM 407 manages VMs 409-411. In one embodiment, the API 432 is a VM API such as VMware's vStorage APIs for Data Protection (VADP). In one embodiment, a user may request a backup or recovery of a VM from storage system 380. In another embodiment, a user may request the backup or recovery from VM management server 350, as previously described.

Storage system 380 may include any type of server or cluster of servers. For example, storage system 380 may be a storage server used for any of various different purposes, such as to provide multiple users with access to shared data and/or to back up mission critical data. Storage system 380 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, or essentially any other type of data storage device. Storage system 180 may have a distributed architecture, or all of its components may be integrated into a single unit. Storage system 380 may be implemented as part of a storage system available from EMC® Corporation of Hopkinton, Mass.

As shown, storage system 380 includes backup/restore logic 383 that manages both backup and restore processes within the storage system, although the backup and restore processes may be performed by separate logics in some embodiments. Storage unit 308 of storage system 380 also contains VM disk data 390 that may include the content files (or file data) of the VMs. Storage unit 308 further contains snapshot differencing data 391 that may include disk image checkpoints, which bootstrap VMs (e.g., VMs 409-411) using disk images. A portion of snapshot differencing data (e.g., a snapshot differencing file) contains a point in time, which is used to make up a timeline with other portions of the snapshot differencing data in the chain. These portions enable a VM to revert to a previous state, which may allow a user to create a specific condition for troubleshooting a problem. In one embodiment, each portion of the snapshots differencing data 391 (e.g., a snapshot differencing file) may include the state, data, and hardware configuration of a VM (e.g., VMs 409-411) at the time of the file creation. Note that a storage system of a client may also be called the primary storage of the client to distinguish the storage from backup storage systems.

A VM represents a completely isolated operating environment with a dedicated set of virtual resources associated with it. A VM may be installed or launched as a guest OS hosted by a host OS or a hypervisor. Typically, a host OS or hypervisor represents a VMM (e.g., VMM 407) for managing the hosted VMs. A VM can be any type of virtual machines, such as, for example, hardware emulation, full virtualization, para-virtualization, and operating system-level virtualization virtual machines. Different VMs hosted by a server may have the same or different privilege levels for accessing different resources. Here, VMM 407 manages both VM 409 and VM 411.

Referring back to FIG. 3, storage system 380 further includes metadata generation logic 384 and index library 385. Using index library 385, metadata generation logic 384 may parse VM disk data 390 and/or snapshot differencing data 391 (e.g., one or more consistent states) to extract and obtain file metadata (also referred to as file-level metadata) corresponding to content files (or data objects) of one or more VMs (e.g., VMs 409-411). File metadata may include information that describes their corresponding content files (or data objects) captured in VM disk data 390 and/or snapshot differencing data 391. The information may be used to summarize basic information about the content files. The information may include, but not limited to, means of creation of the file (or data), purpose of the data, time and date of creation, creator or author of the data, location where the file was created, file size, data quality, source of the data, process used to create the data, etc. The information may also include a file name, a storage unit (e.g., unit 308) where data segments associated with the file name are stored, reconstruction information for a file using the segments, and/or any other appropriate metadata information. Metadata information may further include index information (e.g., location information for data segments in a storage unit, e.g., storage unit 308).

Index library 385 may include a number of indexes or locations that help locate the file metadata for one or more VMs in VM disk data 390 and/or snapshot differencing data 391. For example, each index may be a reference to a specific sector in VM disk data 390 and/or snapshot differencing data 391 that stores the file metadata for a VM. Based on a metadata size (which may be predetermined), metadata generation logic 384 may extract file metadata of content files for the VM. Metadata generation logic 384 may store the extracted file metadata as part of metadata catalog 392 (e.g., a set of tables). In one embodiment, the indexes in index library 385 may be predetermined. In another embodiment, the indexes may be recorded while a consistent state or snapshot is established for a VM (e.g., VM 409/411). In one embodiment, the metadata catalog 392 is successfully created when all indexes in index library 385 have been serviced. That is, file metadata corresponding to each of the indexes has been extracted and stored in metadata catalog 392. After the metadata catalog 392 is successfully created, in one embodiment, metadata generation logic 384 may notify another system (e.g., index server 351) that a new VM has been backed up.

With continued reference to FIG. 3, system 300 further includes an index server 351 communicatively coupled to clients 301-302, VM management server 350, and storage system 380 over network 303. Index server 351 may include an index manager 389 that serves to index content files so that they are included in searches. For example, after a new VM backup is detected (e.g., notification is received from metadata generation logic 384), index server 351 may download and store metadata catalog 392 from storage system 380. Based on the file metadata from catalog 392, index manager 389 may index content files of one or more VMs in VM disk data 390 and/or snapshot differencing data 391 over network 303. That is, index manager 389 may randomly search and/or analyze the content files using the file metadata from catalog 392.

FIG. 5A is a table illustrating performance comparison of a conventional virtualization management system and the virtualization management system according to one embodiment using a single thread. Referring to FIG. 5A, table 500 includes column 501, which represents the performance of the conventional virtualization management system, and column 502, which represents the performance of system 300 (as previously described).

As shown, suppose there is VM disk data (e.g., VMDK file) with a size of 60 GB. Using the conventional system (as shown in column 501), 60 GB of VM disk data would need to be transported from a storage system (e.g., system 180) to an index server (e.g., server 151). Suppose that the transport velocity is 60 MB/s, it would cost 16.7 minutes to transport the VM disk data to the index server. Moreover, if the index server parses the VM disk data, it would require an additional disk size of 60 GB. On the other hand, using system 300 (as shown in column 502), only 600 MB of available disk space is needed to store the metadata catalog (e.g., catalog 392). In this case, it only takes 10 seconds to transport the metadata catalog from a storage system (e.g., system 380) to an index server (e.g., server 351). From the comparison, it can be seen that system 300 can save disk usage and enhance system performance as compared to the conventional system.

FIG. 5B is a table illustrating performance comparison of a conventional virtualization management system and the virtualization management system according to one embodiment using five threads. Referring to FIG. 5B, table 510 includes column 511, which represents the performance of the conventional virtualization management system, and column 512, which represents the performance of system 300 (as previously described).

As shown, suppose an index server processes five (5) VM backups concurrently and the network bandwidth is the same. Assuming that the 5 threads have available disk space to store the VM disk data, it would require 300 GB of disk space using the convention system (as shown in column 511) as opposed to 3 GB using the system 300 (as shown in column 512). Further, it would take 83.5 minutes to download the 300 GB VM disk data using the conventional system as opposed to 50 seconds using the system 300. Again, from the comparison, it can be seen that system 300 can save disk usage and enhance system performance as compared to the conventional system.

Figure 6:
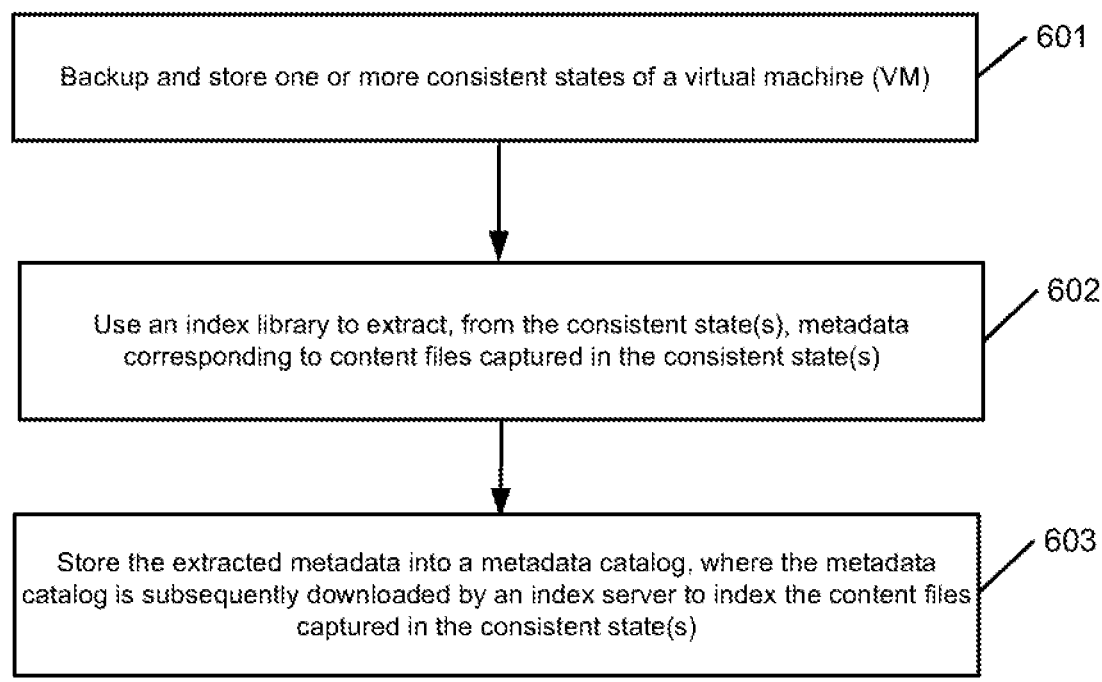
FIG. 6 is a flow diagram illustrating a process to obtain file metadata according to one embodiment.

FIG. 6 is a flow diagram illustrating a process to obtain file metadata according to one embodiment. Process 600 may be performed by processing logic that includes hardware (e.g. circuitry, dedicated logic, etc.), software (e.g., embodied on a non-transitory computer readable medium), or a combination thereof. For example, process 600 may be performed by VM management server 350, storage system 380, index server 351, or a combination thereof.

Referring to FIG. 6, at block 601, the processing logic backs up and stores one or more consistent states of a VM. At block 602, the processing logic uses an index library to extract, from the consistent state(s), metadata corresponding to content files captured in the consistent state(s). At block 603, the processing logic stores the extracted metadata into a metadata catalog, where the metadata catalog is subsequently downloaded by an index server to index the content files in the consistent state(s).

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
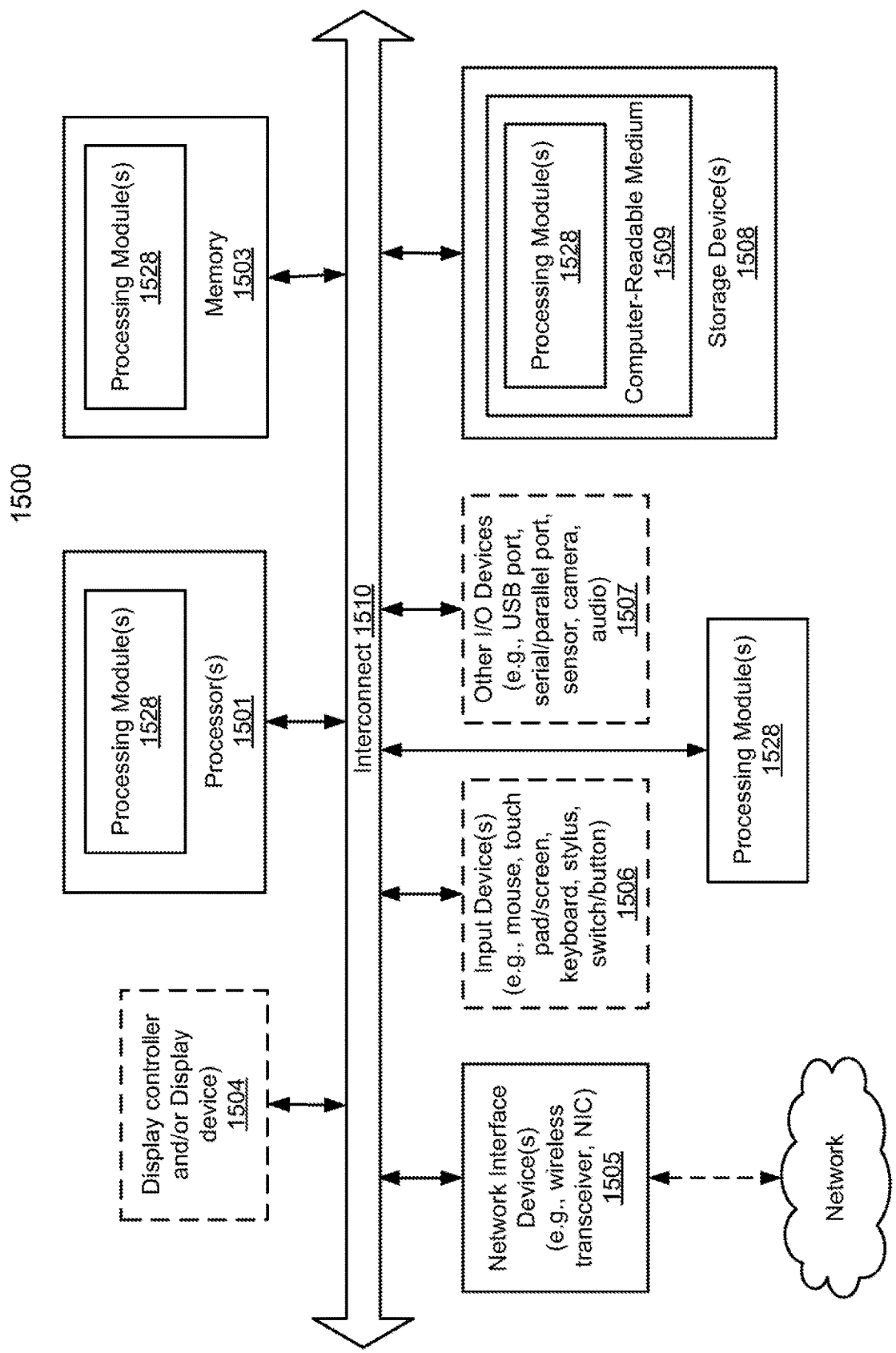
FIG. 7 is a block diagram illustrating a data processing system according to one embodiment.

FIG. 7 is a block diagram illustrating an example of a data processing system which may be used with one embodiment. For example, system 1500 may represents any of data processing systems such as clients 301-302, storage system 380, VM management server 350 and/or index server 351 described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s)

1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, metadata generation logic 384, backup module 388, and index manager 389, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to obtain file metadata, comprising:
  backing up and storing one or more consistent states of a virtual machine (VM);
  after the one or more consistent states of the VM are backed up and stored, using an index library to extract, from the one or more consistent states of the VM, file-level metadata of content files captured in the one or more consistent states, wherein the index library includes a plurality of locations for locating the file-level metadata of the content files captured in the one or more consistent states, and the file-level metadata includes information that describes the content files captured in the one or more consistent states; and
  storing the extracted file-level metadata of the content files into a metadata catalog, wherein the metadata catalog is subsequently downloaded by an index server that uses the metadata catalog to index the content files captured in the one or more consistent states, such that the content files are included in searches of the backed up and stored consistent states of the VM.

2. The method of claim 1, wherein using the index library to extract the file-level metadata of the content files captured in the one or more consistent states comprises:
  for each location in the index library, parsing the one or more consistent states based on the location to obtain the file-level metadata.

3. The method of claim 1, further comprising: notifying the index server that a new VM has been backed up, wherein the new VM has been backed up if the metadata catalog is successfully created.

4. The method of claim 3, wherein the metadata catalog is successfully created if file-level metadata corresponding to each location in the index library is extracted and stored in the metadata catalog.

5. The method of claim 3, wherein the index server downloads the metadata catalog when the index server receives the notification.

6. The method of claim 1, wherein the one or more consistent states of the VM are backed up when a backup request for the VM is received from a VM management server.

7. A non-transitory machine-readable medium having instructions stored therein, which when executed by a processor, cause the processor to perform operations, the operations comprising:
  backing up and storing one or more consistent states of a virtual machine (VM);
  after the one or more consistent states of the VM are backed up and stored, using an index library to extract, from the one or more consistent states of the VM, file-level metadata of content files captured in the one or more consistent states, wherein the index library includes a plurality of locations for locating the file-level metadata of the content files captured in the one or more consistent states, and the file-level metadata includes information that describes the content files captured in the one or more consistent states; and
  storing the extracted file-level metadata of the content files into a metadata catalog, wherein the metadata catalog is subsequently downloaded by an index server that uses the metadata catalog to index the content files captured in the one or more consistent states, such that the content files are included in searches of the backed up and stored consistent states of the VM.

8. The non-transitory machine-readable medium of claim 7, wherein using the index library to extract the file-level metadata of the content files captured in the one or more consistent states comprises:
  for each location in the index library, parsing the one or more consistent states based on the location to obtain the file-level metadata.

9. The non-transitory machine-readable medium of claim 7, wherein the operations further comprise: notifying the index server that a new VM has been backed up, wherein the new VM has been backed up if the metadata catalog is successfully created.

10. The non-transitory machine-readable medium of claim 9, wherein the metadata catalog is successfully created if file-level metadata corresponding to each location in the index library is extracted and stored in the metadata catalog.

11. The non-transitory machine-readable medium of claim 9, wherein the index server downloads the metadata catalog when the index server receives the notification.

12. The non-transitory machine-readable medium of claim 7, wherein the one or more consistent states of the VM are backed up when a backup request for the VM is received from a VM management server.

13. A data processing system, comprising:
  a processor; and
  a memory coupled to the processor to store instructions, which when executed by the processor, cause the processor to perform operations, the operations including:

backing up and storing one or more consistent states of a virtual machine (VM);

after the one or more consistent states of the VM are backed up and stored, using an index library to extract, from the one or more consistent states of the VM, file-level metadata of content files captured in the one or more consistent states, wherein the index library includes a plurality of locations for locating the file-level metadata of the content files captured in the one or more consistent states, and the file-level metadata includes information that describes the content files captured in the one or more consistent states; and storing the extracted file-level metadata of the content files into a metadata catalog, wherein the metadata catalog is subsequently downloaded by an index server that uses the metadata catalog to index the content files captured in the one or more consistent states, such that the content files are included in searches of the backed up and stored consistent states of the VM.

14. The data processing system of claim 13, wherein using the index library to extract the file-level metadata of the content files captured in the one or more consistent states comprises:

for each location in the index library, parsing the one or more consistent states based on the location to obtain the file-level metadata.

15. The data processing system of claim 13, wherein the operations further include: notifying the index server that a new VM has been backed up, wherein the new VM has been backed up if the metadata catalog is successfully created.

16. The data processing system of claim 15, wherein the metadata catalog is successfully created if file-level metadata corresponding to each location in the index library is extracted and stored in the metadata catalog.

17. The data processing system of claim 15, wherein the index server downloads the metadata catalog when the index server receives the notification.

18. The data processing system of claim 13, wherein the one or more consistent states of the VM are backed up when a backup request for the VM is received from a VM management server.

* * * * *